(12) United States Patent
Tankard (10) Patent No.: US 7,268,516 B2
(45) Date of Patent: Sep. 11, 2007

(54) CIRCUIT FOR USE WITH SWITCHED RELUCTANCE MACHINES

(75) Inventor: Michael Paul Tankard, Harrogate (GB)

(73) Assignee: Switched Reluctance Drives Limited, Harrogate, North Yorkshire (GB)

( * ) Notice: Subject to any disclaimer, the term of this patent is extended or adjusted under 35 U.S.C. 154(b) by 364 days.

(21) Appl. No.: 10/656,821

(22) Filed: Sep. 5, 2003

(65) Prior Publication Data
US 2004/0052125 A1 Mar. 18, 2004

(30) Foreign Application Priority Data
Sep. 12, 2002 (GB) ................................. 0221154.8

(51) Int. Cl.
H02P 23/00 (2006.01)
(52) U.S. Cl. ..................................................... 318/807
(58) Field of Classification Search ................ 318/254, 318/700–701, 138, 439, 727, 800, 801
See application file for complete search history.

(56) References Cited

U.S. PATENT DOCUMENTS

| | | | | |
|---|---|---|---|---|
| 4,725,762 A * | 2/1988 | Jagschitz | ..................... | 315/226 |
| 4,879,641 A * | 11/1989 | Rossi et al. | ..................... | 363/98 |
| 4,890,181 A * | 12/1989 | Nerowski et al. | ............. | 361/18 |
| 5,838,127 A * | 11/1998 | Young et al. | ................ | 318/293 |
| 5,847,532 A * | 12/1998 | Webster | ....................... | 318/701 |
| 5,936,371 A * | 8/1999 | Bolash et al. | ................ | 318/685 |
| 5,977,737 A * | 11/1999 | Labriola, II | .................. | 318/599 |
| 5,984,173 A * | 11/1999 | Edwards | ....................... | 323/207 |
| 6,028,760 A * | 2/2000 | Ferreira | ....................... | 361/190 |
| 6,031,740 A * | 2/2000 | Budmiger | ..................... | 363/58 |
| 6,031,749 A * | 2/2000 | Covington et al. | ........... | 363/98 |
| 6,087,799 A * | 7/2000 | Turner | ......................... | 318/701 |
| 6,137,256 A * | 10/2000 | Morris | ......................... | 318/701 |
| 6,278,211 B1 * | 8/2001 | Sweo | ........................... | 310/114 |
| 6,316,895 B1 * | 11/2001 | Ramarathnam | ............. | 318/439 |
| 6,320,286 B1 * | 11/2001 | Ramarathnam | ............. | 310/50 |
| 6,329,785 B1 * | 12/2001 | Starkie et al. | .............. | 318/811 |

(Continued)

FOREIGN PATENT DOCUMENTS

EP 0 886 370 A2 12/1998

(Continued)

OTHER PUBLICATIONS

Stephenson, et al., "The Characteristics, Design and Applications of Switched Reluctance Motors and Drives," PCIM '93, Nürnberg, Germany, Conference & Exhibition, Jun. 21-24, 1993, pp. 1-68.

(Continued)

Primary Examiner—Lincoln Donovan
Assistant Examiner—Renata McCloud
(74) Attorney, Agent, or Firm—Haynes and Boone, LLP (57) ABSTRACT

A switched reluctance machine is energized by phase circuits with four active switches, for example MOSFETs, arranged in a bridge configuration. The switches are capable of conducting current in both a first direction and a second direction and are capable of operating as a diode. The direction of current flow through the phase winding is reversed when changing from motoring to generating and from generating to motoring. The ratings of the switches are set in accordance with the energy supply and energy return currents.

15 Claims, 4 Drawing Sheets

U.S. PATENT DOCUMENTS

| | | | |
|---|---|---|---|
| 6,384,564 B1 * | 5/2002 | Pollock | 318/701 |
| 6,628,105 B1 * | 9/2003 | Tankard | 322/94 |
| 6,665,158 B2 * | 12/2003 | Walter | 361/18 |
| 6,784,634 B2 * | 8/2004 | Sweo | 318/727 |
| 6,825,627 B2 * | 11/2004 | Berroth et al. | 318/439 |
| 2003/0052643 A1 * | 3/2003 | Sweo | 318/801 |

FOREIGN PATENT DOCUMENTS

| | | |
|---|---|---|
| EP | 1 081 842 A1 | 3/2001 |
| EP | 1209790 A1 * | 5/2002 |
| WO | WO 2054578 A1 * | 7/2002 |

OTHER PUBLICATIONS

Miller et al., "Starter-Alternator for Hybrid Electric Vehicle: Comparison of Induction and Variable Reluctance Machines and Drives," Proceedings of the 1998 IEEE Industry Applications Society Annual Meeting, Oct. 12-15, 1998, vol. 1, pp. 513-523.

* cited by examiner

Prior Art

Fig 4(b)

Prior Art

CIRCUIT FOR USE WITH SWITCHED RELUCTANCE MACHINES

CROSS-REFERENCE TO RELATED APPLICATION

The subject matter of this application is related to the subject matter of British Patent Application No. 0221154.8, filed Sep. 12, 2002, priority to which is claimed under 35 U.S.C. § 119 and which is incorporated herein by reference.

BACKGROUND OF THE INVENTION

1. Field of the Invention

The present invention relates to a circuit for the efficient operation of switched reluctance machines, particularly those machines which are required to be operated in both motoring and generating modes.

2. Description of Related Art

In general, a reluctance machine is an electrical machine in which torque is produced by the tendency of its movable part to move into a position where the reluctance of a magnetic circuit is minimized, i.e. where the inductance of the exciting winding is maximized. In some forms, circuitry is provided for detecting the angular position of the rotor and energizing the phase windings as a function of the rotor position. This type of reluctance machine is generally known as a switched reluctance machine and it may be operated as a motor or a generator. The characteristics of such switched reluctance machines are well known and are described in, for example, "The Characteristics, Design and Application of Switched Reluctance Motors and Drives" by Stephenson and Blake, PCIM'93, Nürnberg, Jun. 21-24, 1993, incorporated herein by reference. That paper describes in some detail the features of the switched reluctance machine which together produce the characteristic cyclically varying inductance of the phase windings. It is well-known in the art that such machines can be operated in either the motoring or generating mode simply by altering the timing of the winding excitation, without altering the direction of current flowing in the phase winding(s).

Figure 1:
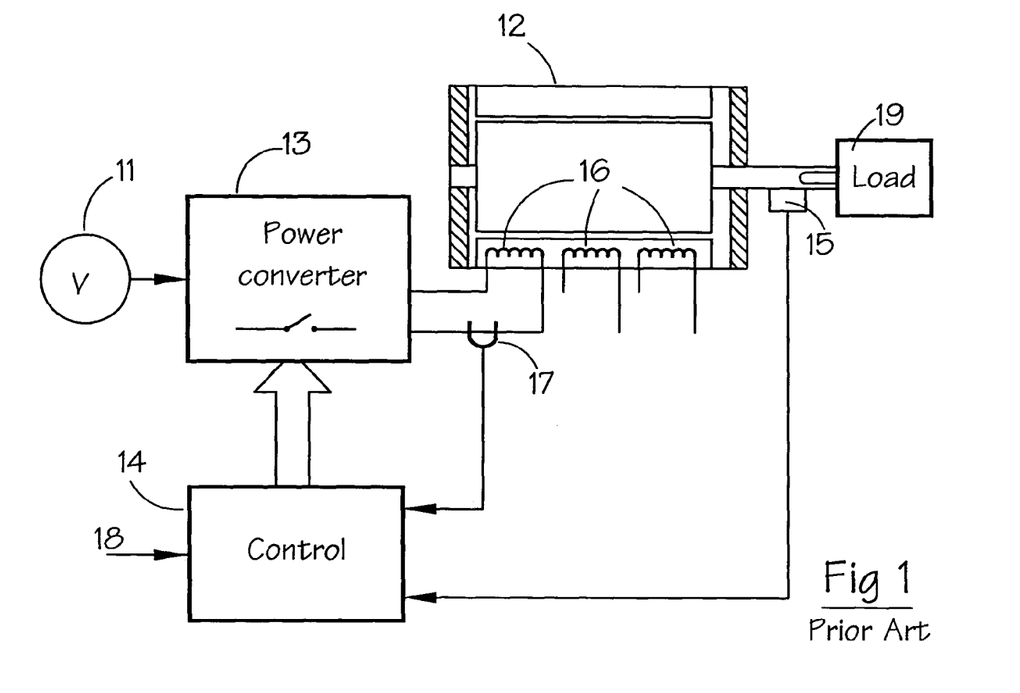
FIG. 1 shows the principal components of a switched reluctance drive system.

FIG. 1 shows the principal components of a typical switched reluctance drive system, connected to a load 19. The input DC power supply 11 can be either a battery or rectified and filtered AC mains and can be fixed or variable in magnitude. In some known drives, the power supply 11 includes a resonant circuit which produces a DC voltage which rapidly varies between zero and a predetermined value to allow zero voltage switching of power switches. The DC voltage provided by the power supply 11 is switched across the phase windings 16 of the motor 12 by a power converter 13 under the control of the electronic control unit 14. The switching must be correctly synchronized to the angle of rotation of the rotor for proper operation of the drive. A rotor position detector 15 or a position detection algorithm supplies signals indicating the angular position of the rotor. Some form of current transducer 17 is normally provided to give phase current feedback. The input demand 18 can be a torque or speed demand for motoring or a current or voltage demand for generating.

Figure 2:
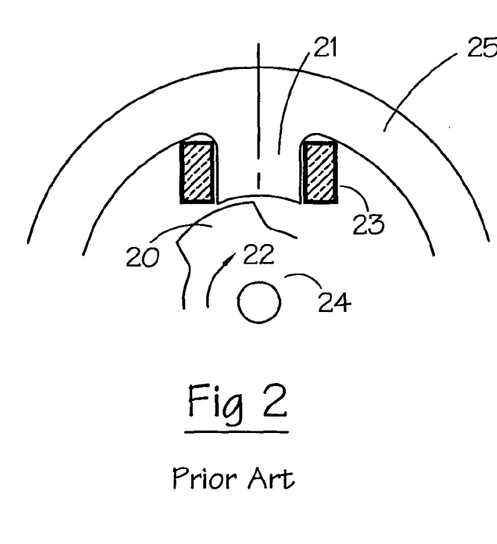
FIG. 2 shows a schematic diagram of a rotor pole approaching a stator pole.
Figure 3:
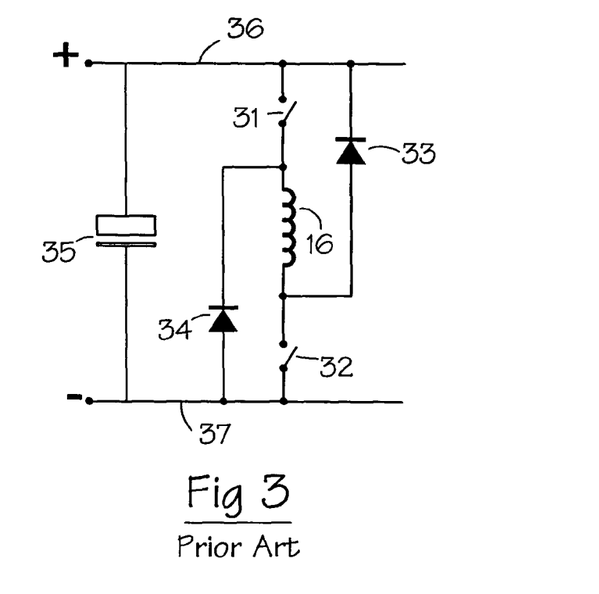
FIG. 3 shows typical switching circuitry in a power converter that controls the energization of the phase windings of the machine of FIG. 1.

The energization of the phase windings in a switched reluctance machine depends on detection of the angular position of the rotor. This may be explained by reference to FIGS. 2 and 3, which illustrate the switching of a reluctance machine operating as a motor. FIG. 2 generally shows a rotor pole 20 approaching a stator pole 21 according to arrow 22. As illustrated in FIG. 2, a portion 23 of a complete phase winding 16 is wound around the stator pole 21. When the portion 23 of the phase winding 16 around stator pole 21 is energized, a force will be exerted on the rotor, tending to pull rotor pole 20 into alignment with stator pole 21. FIG. 3 generally shows typical switching circuitry in the power converter 13 that controls the energization of the phase winding 16, including the portion 23 around stator pole 21 of stator 24. The voltage busses 36, 37 are generally known as the DC link and the capacitor 35 across them is known as the DC link capacitor, whose function is to handle the alternating currents on the DC link. When switches 31 and 32 are closed, the phase winding is coupled to the source of DC power and is energized. When the phase winding of a switched reluctance machine is energized in the manner described above, the magnetic field set up by the flux in the magnetic circuit gives rise to the circumferential forces which, as described, act to pull the rotor poles into line with the stator poles.

Figure 4A:
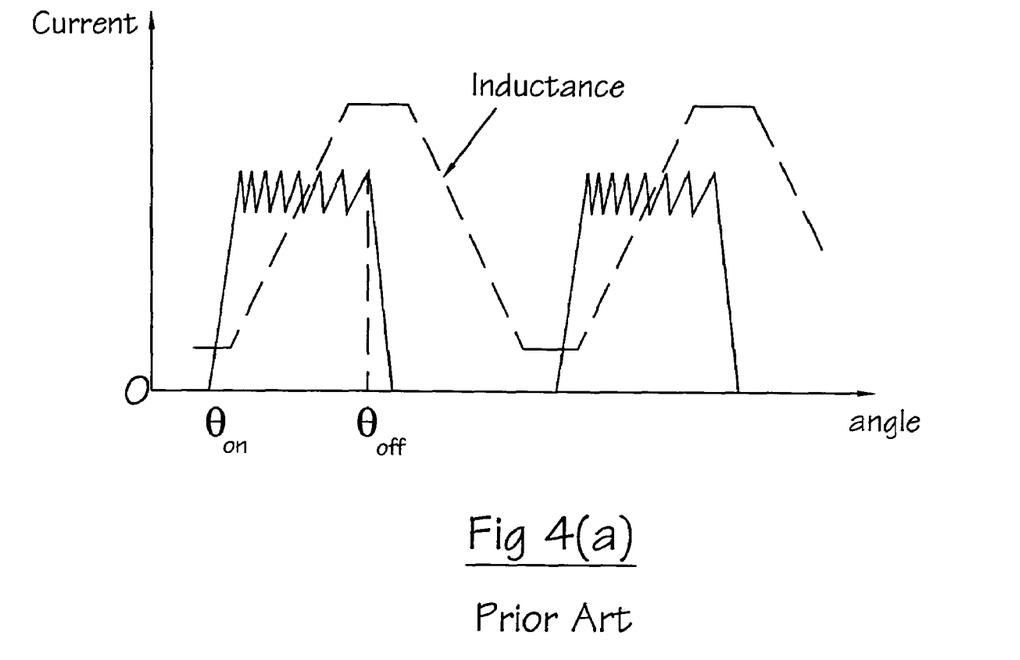
FIGS. 4(a) and 4(b) illustrate typical current waveforms of a switched reluctance drive operating in chopping and single-pulse modes respectively.

In general, the phase winding is energized to effect the rotation of the rotor as follows. At a first angular position of the rotor (called the "turn-on angle", $\theta_{on}$), the controller 14 provides switching signals to turn on both switching devices 31 and 32. When the switching devices 31 and 32 are on, the phase winding is coupled to the DC link, causing an increasing magnetic flux to be established in the machine. The magnetic flux produces a magnetic field in the air gap which acts on the rotor poles to produce the motoring torque. The magnetic flux in the machine is supported by the magnetomotive force (mmf) which is provided by a current flowing from the DC supply 11 through the switches 31 and 32 and the phase winding 23. Current feedback is generally employed and the magnitude of the phase current is controlled by chopping the current by rapidly switching one or both of switching devices 31 and/or 32 on and off. FIG. 4(a) shows a typical current waveform in the chopping mode of operation, where the current is chopped between two fixed levels. In motoring operation, the turn-on angle $\theta_{on}$ is often chosen to be the rotor position where the center-line of an inter-polar space on the rotor is aligned with the center-line of a stator pole, but may be some other angle. FIG. 4(a) also shows the form of the idealized inductance profile of the phase winding.

In many systems, the phase winding remains connected to the DC link (or connected intermittently if chopping is employed) until the rotor rotates such that it reaches what is referred to as the "freewheeling angle", $\theta_{fw}$. When the rotor reaches an angular position corresponding to the freewheeling angle (e.g., the position shown in FIG. 2) one of the switches, for example 31, is turned off. Consequently, the current flowing through the phase winding will continue to flow, but will now flow through only one of the switches (in this example 32) and through only one of the diodes 33/34 (in this example 34). During the freewheeling period, the voltage drop across the phase winding is small, and the flux remains substantially constant. The circuit remains in this freewheeling condition until the rotor rotates to an angular position known as the "turn-off angle", $\theta_{off}$, (e.g. when the center-line of the rotor pole is aligned with that of the stator pole). When the rotor reaches the turn-off angle, both switches 31 and 32 are turned off and the current in phase winding 23 begins to flow through diodes 33 and 34. The diodes 33 and 34 then apply the DC voltage from the DC link in the opposite sense, causing the magnetic flux in the machine (and therefore the phase current) to decrease.

It is known in the art to use other switching angles and other current control regimes. Similarly, many other configurations of lamination geometry, winding topology and switching circuitry are known in the art, some of which are discussed in the Stephenson & Blake paper cited above.

Figure 4B:
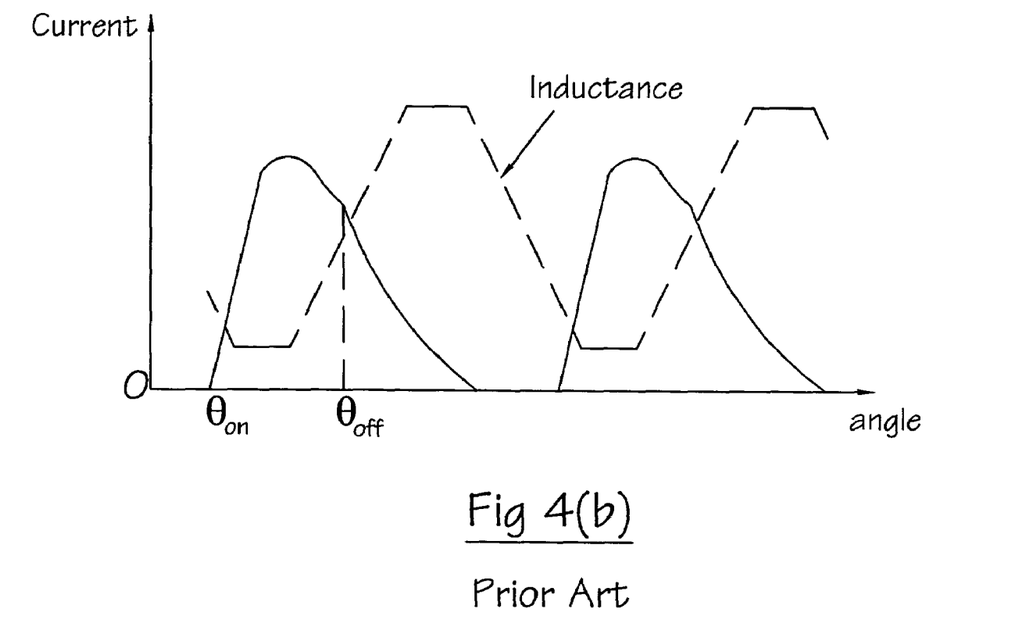

As the speed of the machine rises, there is less time for the current to rise to the chopping level, and the drive is normally run in a "single-pulse" mode of operation. In this mode, the turn-on, freewheel and turn-off angles are chosen as a function of, for example, speed and load torque. Some systems do not use an angular period of freewheeling, i.e. switches 31 and 32 are switched on and off simultaneously. FIG. 4(b) shows a typical such single-pulse current waveform where the freewheel angle is zero. It is well known that the values of turn-on, freewheel and turn-off angles can be predetermined and stored in some suitable format for retrieval by the control system as required, or can be calculated or deduced in real time.

Figure 5A:
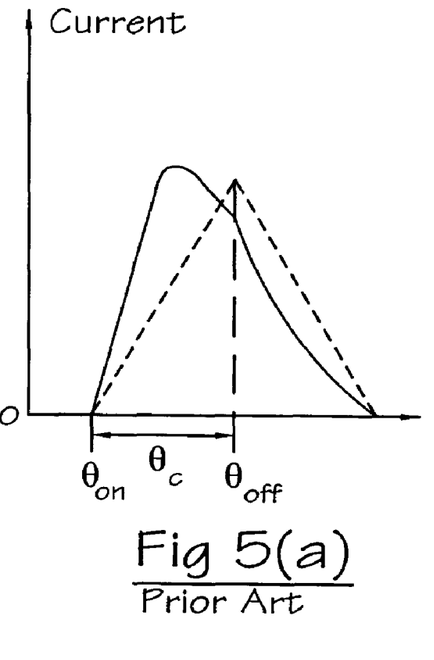
FIGS. 5(a) and 5(b) show current and flux waveforms for motoring and generating modes respectively.
Figure 5B:
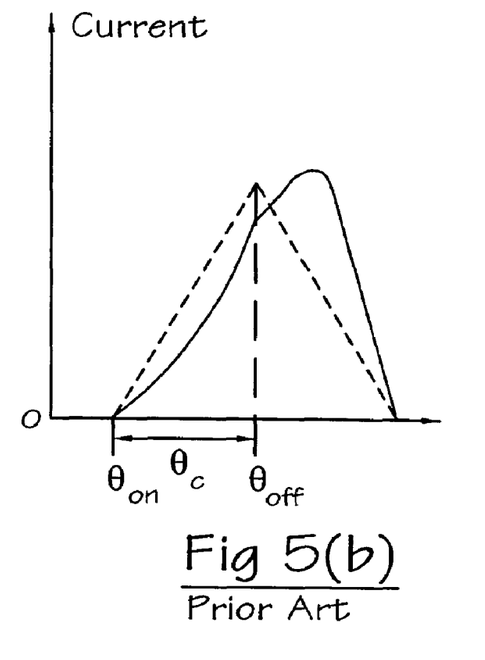

FIG. 5(a) shows the current and flux waveforms for a typical single-pulse operating point in motoring. It will be noted that the current and flux begin to rise as soon as the voltage is applied to the phase winding at $\theta_{on}$. The voltage is applied for a conduction angle $\theta_c$. At the switch-off angle $\theta_{off}$, the gradient of the flux reverses as the voltage across the coil is reversed and, in the absence of eddy currents in the magnetic circuit, the current and flux reach zero together. This Figure is drawn for the ideal case of zero resistance, so the rise and fall times are equal. FIG. 5(b) shows the waveforms for the corresponding generating point, in which the waveforms are a mirror image in time of those of FIG. 5(a).

It will be noted that the currents in the switches and in the diodes are generally different. For example, in the motoring mode of FIG. 5(a) the switch current is significantly greater than the diode current—indeed the root mean square (rms) value is probably three times that of the diode current. By contrast, in the generating mode of FIG. 5(b) the diode current has the larger value. It follows that if the drive is required to provide broadly the same output in motoring and generating the ratings of the switches and diodes must be broadly the same.

The losses associated with the currents in the switches and diodes may be significant, either with respect to the cooling of the devices themselves, to keep them within their thermal operating limits, or with respect to the overall efficiency of the drive. In an industrial drive operating from, say, a 400V 3-phase supply and developing tens or hundreds of kilowatts, the device losses will probably be below 3% of the total input power. In a low-voltage drive however, the devices losses can be 10% or more of the input.

One solution to this problem is to use devices with larger silicon area, and this will improve the situation to a limited extent, albeit at the expense of the size and cost of the devices. However, this is beneficial mainly to the switches, since the voltage drop characteristic of the diodes is either a constant value (e.g. 1.0V) or a constant plus a current dependent term (e.g. 0.5V+0.05i). This is not too much of a problem in the motoring mode, when the diode current is relatively small. However, in the generating mode the larger current often produces losses which are a serious drawback to efficient operation.

Figure 6:
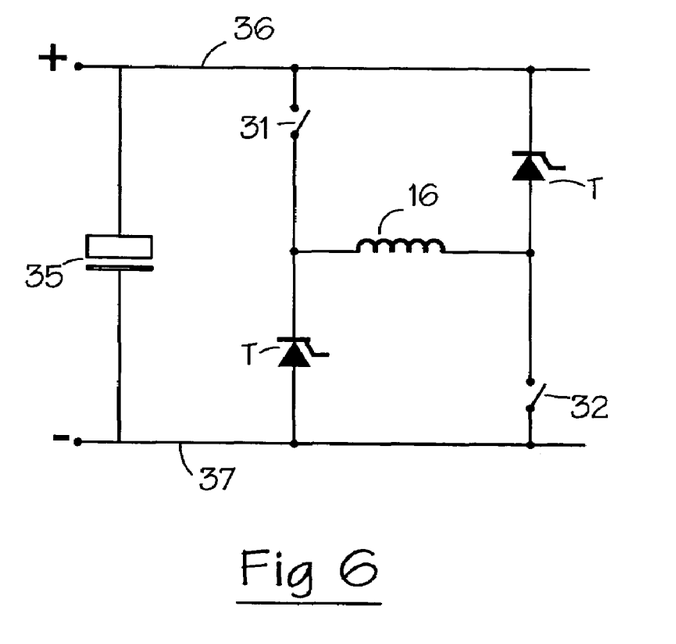
FIG. 6 shows an alternative circuit for energizing a phase winding.

It would be possible to replace the diodes with thyristors, as shown in FIG. 6, but there is no advantage in this, for two reasons. Firstly, the timing of the switching of the thyristor would be absolutely critical, since the thyristor would need to be fired at the instant the corresponding main switch was opened. Because of finite switching times associated with the devices (generally of the order of 10-20 μsec, depending on its size), it would be extremely difficult to ensure correct firing at all times. Secondly, even if the first objection were overcome, the voltage drop across the thyristor would be greater than across the diode it replaced, leading to larger, not smaller, device losses.

Other types of switch would be precluded, for the same or additional reasons. For example, an Integrated Gate Bipolar Transistor (IGBT) could be considered on the grounds that it would have a smaller device loss than a thyristor, but replacing the diode by an IGBT would not work, since the reverse voltage across the IGBT would destroy it.

Figure 7:
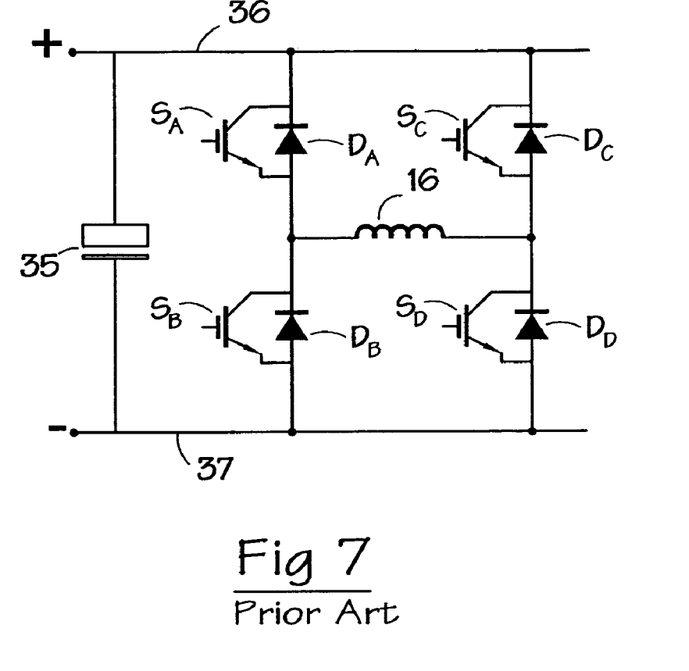
FIG. 7 shows a prior art energization circuit using eight devices per phase.

It has been known to use standard configurations of IGBTs and diodes, which are available in industry-standard modules, for a switched reluctance drive. For example, the paper "Starter-alternator for hybrid electric vehicle: Comparison of induction and variable reluctance machines and drives" by Miller et al, Proceedings of the 1998 IEEE Industry Applications Society Annual Meeting, Oct. 12-15, 1998, St Louis, Mo., Vol. 1, pp 513-523, incorporated herein by reference, describes the arrangement of IGBTs and diodes reproduced in FIG. 7. The use of this circuit is described in the paper at p 517, column 2. In one cycle of phase conduction, the IGBTs $S_A$ & $S_D$ are used as switches and the return diodes are $D_B$ and $D_C$. IGBTs $S_B$ and $S_C$ are biased to the off condition. In the following cycle of phase conduction, the IGBTs $S_C$ & $S_B$ are used as switches and the return diodes are $D_A$ and $D_D$. IGBTs $S_A$ and $S_D$ are biased to the off condition. This is done so that current will flow in opposite directions in the phase winding on successive cycles, thus reducing mutual coupling between adjacent phases, as described at page 518, column 1, lower half. While this achieves the high torque output sought by the authors, it is a very costly solution, requiring eight devices per phase.

European Patent Application No. 0886370, incorporated herein by reference, also discloses a switching circuit in which a half bridge module is connected between the voltage rails. A diode is connected across each switch to conduct towards the positive rail. The phase current reverses direction on alternate cycles or on groups of cycles.

SUMMARY OF THE INVENTION

It is an object of embodiments of this invention to provide an efficient and economic circuit for a switched reluctance drive which can operate in both motoring and generating modes.

According to embodiments of the invention there is provided an excitation circuit for a switched reluctance drive, the excitation circuit comprising a plurality of switches for connecting a phase winding to a supply, the plurality of switches comprising a first set and a second set for supplying current to the phase winding and returning current to the supply, the switches of the first and second set being capable of conducting current in both a first and a second direction and the first set and second set being capable of handling different peak currents.

The excitation circuit is optionally arranged, during a motoring mode, to supply current to the phase winding via the first set and to provide a path for returning current to the supply via the second set and, during a generating mode, to supply current to the phase winding via the second set and to return current to the supply via the first set. The direction of the current in the phase winding in a motoring mode is generally opposite to the direction of the current in the phase winding in a generating mode.

At least one of the switches is capable of operating as a diode, according to embodiments of the invention; for instance the switch may have an inherent integral reverse diode. An example of a suitable switch is a MOSFET and in particular an enhancement layer MOSFET. Each of the switches may be a MOSFET.

In one implementation, four switches are provided and the first set comprises two switches which are rated to a higher rating (i.e. are capable of handling higher peak currents) than the remaining two switches forming the second set. The excitation circuit may comprise a first switch connected between a first end of the phase winding and a first voltage rail, a second switch connected between the first end of the phase winding and a second voltage rail, a third switch connected between a second end of the phase winding and the first voltage rail, and a fourth switch connected between the second end of the phase winding and the second voltage rail, the first and fourth switches forming the first set. The second set may comprise the second and third switch.

In a further aspect of the invention there is provided a switched reluctance drive including a machine having a rotor defining a plurality of rotor poles, a stator defining a plurality of stator poles, and at least one phase winding for exciting two or more of the poles, the switched reluctance drive including an excitation circuit comprising a plurality of switches for connecting a phase winding to a supply, the plurality of switches comprising a first set and a second set, the excitation circuit being arranged, during a motoring mode, to supply current to the phase winding via the first set and to provide a path for returning current to the supply via the second set and, during a generating mode, to supply current to the phase winding via the second set and to return current to the supply via the first set, the first set and second set being capable of handling different peak currents.

The direction of the current in the phase winding in a motoring mode is opposite to the direction of the current in the phase winding in a generating mode, according to embodiments of the invention.

In a further aspect of the invention there is provided a method of controlling a switched reluctance drive including a machine having a rotor defining a plurality of rotor poles, a stator defining a plurality of stator poles, and at least one phase winding for exciting two or more of the poles, the switched reluctance drive including an excitation circuit comprising a plurality of switches for connecting a phase winding to a supply, the plurality of switches comprising a first set and a second set, the method comprising, during a motoring mode, supplying current to the phase winding via the first set and returning current to the supply via the second set and, during a generating mode, supplying current to the phase winding via the second set and returning current to the supply via the first set.

BRIEF DESCRIPTION OF THE DRAWINGS

The invention can be put into practice in a number of ways, some of which will now be described by way of example, with reference to the accompanying drawings in which.

DETAILED DESCRIPTION OF PREFERRED EMBODIMENTS

Embodiments of the invention take advantage of the characteristic of some switches which are able to conduct current in both directions and also to act as a diode at least on a transient basis. For example, a Metal-Oxide Silicon Field Effect Transistor (MOSFET) has desired characteristics. These characteristics are well-known in the art and are covered in standard texts, e.g. "Power Semiconductor Applications", Philips Semiconductors, April 1991. Enhancement layer MOSFETs are one possible type of switch to be used.

Figure 8:
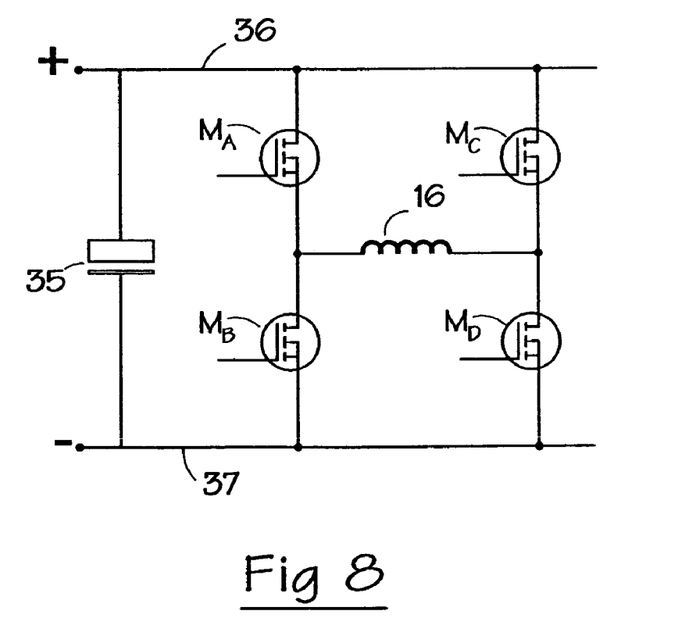
FIG. 8 shows an energization circuit according to one embodiment of the invention.

As shown in FIG. 8, an embodiment of an excitation circuit for energizing a switched reluctance machine has four active switches $M_A$, $M_B$, $M_C$, and $M_D$, which are optionally MOSFETs, arranged in a bridge configuration around a phase winding 16. The switches are capable of conducting current in both a first direction and a second direction and are capable of operating as a diode. The direction of current flow through the phase winding 16 is reversed when changing from motoring to generating and from generating to motoring. The ratings of the switches are set in accordance with the energy supply and energy return currents.

Assume firstly that the drive is operating in the motoring mode. Switches $M_A$ and $M_D$ act as the energizing switches to excite the winding. At the end of the conduction period, one or both switches is opened, depending on whether freewheeling is being used. Although the MOSFETs $M_B$ and $M_C$ are not switched on, the body diode of the device will initially act as a conventional diode and conduct current to the supply. At this point, having allowed sufficient time for the devices $M_A$ and/or $M_D$ to turn off completely, switches $M_B$ and $M_C$ are fired, thus allowing them to conduct current through the main current carrying channels in the device. The devices remain conducting until the current has fallen to zero.

The devices $M_B$ and $M_C$ thus act as conventional diodes. Since the conduction loss of a MOSFET is less than that of a diode of the same current rating, this circuit is more efficient than its conventional equivalent.

Assume now that the drive is operating in the generating mode. The circuit can be operated in exactly the same way as outlined above, with the excitation now timed to coincide with the falling inductance. Since the excitation currents are now small, $M_A$ and $M_D$ will be under used. By contrast, the larger current is now carried by $M_B$ and $M_C$, which will have to be rated to carry it.

However, since the circuit is symmetrical, and since the torque production in a reluctance machine depends only on the magnitude of the flux and not on its direction, it is possible to reverse the roles of the MOSFETs and hence reverse the direction of current in the phase winding. The output of the machine is unchanged, but $M_B$ and $M_C$ now act as switches to supply the (smaller) excitation current and $M_A$ and $M_D$ act as diodes carrying the (larger) energy return current.

With this reversal of phase current direction for generation, it will be seen that the smaller current is now carried by $M_B$ and $M_C$, regardless of whether the drive is motoring or generating. It is therefore possible to reduce the rating of these two devices. For example, in a drive which is rated at 2 kW in both motoring and generating, the rating of these devices can be reduced to 25% of the other two switches, representing a very significant saving. Thus this circuit and the method of operation described above achieve the twin benefits of reduced cost and increased efficiency.

Although the description refers mainly to a MOSFET type of switch, it is the intention that embodiments of the invention extend to cover other switches that may be developed in the future that also can act as both a switch and a diode when current is reversed. Embodiments of the invention particularly extend to those switches that are capable of conducting current in both a first direction and a second direction and optionally those that are also capable of operating as a diode.

It will be realized that embodiments of the invention can be applied to any switched reluctance machine with any number of phases and poles and any lamination geometry. Similarly, embodiments of the invention could be applied to a linear machine where the moving part (often referred to as a "rotor") travels linearly. Thus, the skilled person will appreciate that variations of the disclosed arrangements are possible without departing from the invention. Accordingly, the above description of several embodiments is made by way of example and not for the purposes of limitation. The present invention is intended to be limited only by the scope of the following claims.

What is claimed is:

1. An excitation circuit for a switched reluctance drive, the excitation circuit comprising a plurality of switches for connecting a phase winding to a supply, the plurality of switches comprising a first set of switches for connecting the phase winding to the supply and a second set of switches for connecting the phase winding to the supply, the first set of switches and the second set of switches being adapted to supply current to the phase winding and return current to the supply, one switch of each set being connected between the supply and a first end of the phase winding and another switch of each set being connected between the supply and a second end of the phase winding, the switches of the first set and the switches of the second set being arranged to conduct current in both a first and a second direction, the switches of the first set being rated for a higher current than the switches of the second set.

2. The excitation circuit according to claim 1 wherein the excitation circuit is arranged, during a motoring mode, to supply current to the phase winding via the first set and to provide a path for returning current to the supply via the second set and, during a generating mode, to supply current to the phase winding via the second set and to return current to the supply via the first set.

3. An excitation circuit according to claim 1, the direction of the current in the phase winding in a motoring mode being opposite to the direction of the current in the phase winding in a generating mode.

4. An excitation circuit according to claim 1 wherein at least one of the switches is capable of operating as a diode.

5. An excitation circuit according to claim 4 wherein the at least one switch has an inherent integral reverse diode.

6. An excitation circuit according to claim 4 wherein the at least one switch comprises a MOSFET.

7. An excitation circuit according to claim 1 wherein the switches comprise enhancement layer MOSFET switches.

8. An excitation circuit according to claim 1 wherein four switches are provided and the first set comprises two switches which are rated to a higher rating than the remaining two switches forming the second set.

9. An excitation circuit according to claim 1 wherein the excitation circuit comprises a first switch connected between a first end of the phase winding and a first voltage rail, a second switch connected between the first end of the phase winding and a second voltage rail, a third switch connected between a second end of the phase winding and the first voltage rail, and a fourth switch connected between the second end of the phase winding and the second voltage rail, the first and fourth switches forming the first set.

10. An excitation circuit according to claim 9 wherein the second and third switches form the second set.

11. An excitation circuit according to claim 1 wherein each of the switches is a MOSFET.

12. A switched reluctance drive including a machine having a rotor defining a plurality of rotor poles, a stator defining a plurality of stator poles, and at least one phase winding for exciting two or more of the poles, the switched reluctance drive including an excitation circuit comprising a plurality of switches for connecting a phase winding to a supply, the plurality of switches comprising a first set and a second set, the excitation circuit being arranged, during a motoring mode, to supply current to the phase winding via the first set and to provide a path for returning current to the supply via the second set and, during a generating mode, to supply current to the phase winding via the second set and to return current to the supply via the first set, the switches of the first set being rated for a higher current than the switches of the second set.

13. A switched reluctance drive according to claim 12, the direction of the current in the phase winding in a motoring mode being opposite to the direction of the current in the phase winding in a generating mode.

14. A method of controlling a switched reluctance drive including a machine having a rotor defining a plurality of rotor poles, a stator defining a plurality of stator poles, and at least one phase winding for exciting two or more of the poles, the switched reluctance drive including an excitation circuit comprising a plurality of switches for connecting a phase winding to a supply, the plurality of switches comprising a first set and a second set, the method comprising, during a motoring mode, supplying current to the phase winding via the first set and returning current to the supply via the second set and, during a generating mode, supplying current to the phase winding via the second set and returning current to the supply via the first set, wherein the switches of the first set are rated for a higher current than the switches of the second set.

15. A switched reluctance drive including a machine having a rotor defining a plurality of rotor poles, a stator defining a plurality of stator poles, at least one phase winding for exciting two or more of the poles, and an excitation circuit, the excitation circuit comprising a plurality of switches for connecting a phase winding to a supply, means for supplying current during a motoring mode to the phase winding via a first set of the switches and returning current to the supply via a second set of the switches, and means for supplying current during a generating mode to the phase winding via the second set and returning current to the supply via the first set, the switches of the first set being rated for a higher current than the switches of the second set.

* * * * *

UNITED STATES PATENT AND TRADEMARK OFFICE
CERTIFICATE OF CORRECTION

| | | |
|---|---|---|
| PATENT NO. | : 7,268,516 B2 | |
| APPLICATION NO. | : 10/656821 | |
| DATED | : September 11, 2007 | |
| INVENTOR(S) | : Michael Paul Tankard | |

It is certified that error appears in the above-identified patent and that said Letters Patent is hereby corrected as shown below:

Title Page, (73) Assignee, the word "Drivers" should be replaced with -- Drives --. The full Assignee name should read as --Switched Reluctance Drives Limited--.

Signed and Sealed this

Fourth Day of December, 2007

JON W. DUDAS
*Director of the United States Patent and Trademark Office*